United States Patent
Ishiyama

(10) Patent No.: US 10,569,374 B2
(45) Date of Patent: Feb. 25, 2020

(54) PRODUCTION FACILITY

(71) Applicant: Nao Ishiyama, Shizuoka (JP)

(72) Inventor: Nao Ishiyama, Shizuoka (JP)

(73) Assignee: NTN CORPORATION, Osaka (JP)

(*) Notice: Subject to any disclaimer, the term of this patent is extended or adjusted under 35 U.S.C. 154(b) by 576 days.

(21) Appl. No.: 14/783,643

(22) PCT Filed: Mar. 14, 2014

(86) PCT No.: PCT/JP2014/056915
§ 371 (c)(1),
(2) Date: Oct. 9, 2015

(87) PCT Pub. No.: WO2014/167941
PCT Pub. Date: Oct. 16, 2014

(65) Prior Publication Data
US 2016/0306346 A1 Oct. 20, 2016

(30) Foreign Application Priority Data
Apr. 12, 2013 (JP) ................................. 2013-083831

(51) Int. Cl.
B23P 21/00 (2006.01)
G05B 19/418 (2006.01)

(52) U.S. Cl.
CPC ...... *B23P 21/004* (2013.01); *G05B 19/41845* (2013.01)

(58) Field of Classification Search
CPC . G05B 19/41845; B65G 47/52; B23P 21/004; Y02P 90/16; F16C 19/186
See application file for complete search history.

(56) References Cited

U.S. PATENT DOCUMENTS 5,353,495 A 10/1994 Terabayashi et al.
5,824,921 A 10/1998 Kanai
(Continued)

FOREIGN PATENT DOCUMENTS

CN 1103726 6/1995
CN 1183336 6/1998
(Continued)

OTHER PUBLICATIONS

"Ballscrew rotative nut" published Sep. 7, 2012 on youtube.com by forhobby.*
(Continued)

*Primary Examiner* — Michael S Lowe
(74) *Attorney, Agent, or Firm* — Wenderoth, Lind & Ponack, L.L.P.

(57) ABSTRACT

Provided is a production facility (1), including: a plurality of production units (10A to 10E) coupled to each other in a separable manner; a guide rail (2) extending in a unit coupling direction; and transfer means (3) capable of sequentially transferring, by moving along the guide rail (2), a workpiece from the production unit (10A) toward the production unit (10E). Each of the plurality of production units (10A to 10E) includes: a processing section (13) configured to execute predetermined processing; a control section (14) configured to electrically control an operation of the processing section (13); a rail member (20) constructing the guide rail (2); and a slide member (30) constructing the transfer means (3). Each of the plurality of production units (10A to 10E) further includes: a connector (15, 15) configured to electrically connect the control section (14) thereof and the control section (14) of the adjacent production unit (10).

8 Claims, 8 Drawing Sheets

(56) References Cited

U.S. PATENT DOCUMENTS

| | | | | |
|---|---|---|---|---|
| 2003/0088974 A1* | 5/2003 | Nakamura | ............ | H05K 13/02 |
| | | | | 29/740 |
| 2009/0012642 A1 | 1/2009 | Mertens et al. | | |
| 2009/0151148 A1* | 6/2009 | Reinisch | ............... | B23P 21/004 |
| | | | | 29/564.1 |

FOREIGN PATENT DOCUMENTS

| | | |
|---|---|---|
| DE | 37 27 450 | 3/1989 |
| DE | 37 30 972 | 3/1989 |
| DE | 10 2006 032 121 | 1/2008 |
| EP | 1 435 275 | 7/2004 |
| JP | 7-1298 | 1/1995 |
| JP | 2007-530303 | 11/2007 |
| JP | 2008-233980 | 10/2008 |

OTHER PUBLICATIONS

Office Action dated Aug. 25, 2016 in corresponding Chinese Application No. 201480018782.X, with partial English translation.
International Preliminary Report on Patentability and Written Opinion of the International Searching Authority dated Oct. 13, 2015 in International Application No. PCT/JP2014/056915. (English Translation).
International Search dated May 20, 2014 in International (PCT) Application No. PCT/JP2014/056915.
Extended European Search Report dated Oct. 18, 2016 in corresponding European Application No. 14783295.0.

* cited by examiner

PRODUCTION FACILITY

TECHNICAL FIELD

The present invention relates to a production facility, and more particularly, to a flexible production facility that is easily and promptly compatible even when any process step needs to be changed.

BACKGROUND ART

For example, in Patent Literature 1, there is disclosed a production facility including a plurality of production units formed so as to be freely coupled to each other, a conveyance rail provided so as to be capable of coupling the production units to each other, a transfer unit configured to move along the conveyance rail to load and unload a workpiece into and from each of the production units (transfer the workpiece between the production units), and a control section configured to freely move the transfer unit to any of the plurality of production units as desired. In this production facility, the production units are freely coupled to each other, and hence the respective production units can freely be recombined with each other. Therefore, there is an advantage in that, even when an object to be produced (workpiece to be loaded into the production facility) is changed and any process step needs to be changed (any production unit needs to be added or removed) along with the change of the object to be produced, the production facility is compatible with the change of the process step easily and promptly.

CITATION LIST

Patent Literature 1: JP 2008-233980 A

SUMMARY OF INVENTION

Technical Problem

In the production facility of Patent Literature 1, the transfer unit configured to load and unload the workpiece into and from each of the production units is freely movable to any of the plurality of production units as desired. In this configuration, however, every time the process step is changed, the program for controlling the movement of the transfer unit needs to be modified. Further, in the production facility of Patent Literature 1, the production units are electrically connected to an electric power line arranged above the production units, individually, thereby requiring time and labor for work of constructing (reconstructing) an electric system when the process step is changed, and also imposing restrictions on how the production units are arranged. Thus, it is hard to say that the production facility of Patent Literature 1 is easily compatible with the change of the process step, leaving room for improvement.

Further, the production facility of Patent Literature 1 is configured such that the transfer unit transfers, to another production unit, a workpiece such as an electronic component supplied to one production unit (loading and accommodating unit) selected from among the plurality of production units, and then transfers, to the above-mentioned loading and accommodating unit again, the workpiece subjected to predetermined processing (for example, characteristic inspection or appearance inspection) by the other production unit. That is, in the production facility of Patent Literature 1, one or more idle (stopped) production units are present even under a state in which the production facility is operated as a whole. Thus, the production facility of Patent Literature 1 has room for improvement in productivity as well.

Therefore, it is an object of the present invention to provide a production facility easily compatible with a change of a process step, and also capable of enhancing productivity (production efficiency, inspection efficiency, and the like).

Solution to Problem

According to one embodiment of the present invention, which is devised to attain the above-mentioned object, there is provided a production facility, comprising: a plurality of production units coupled to each other in a separable manner; a guide rail extending in a unit coupling direction of the production facility; and transfer means capable of sequentially transferring, by moving along the guide rail, a workpiece from one of the plurality of production units arranged at one end of the production facility in the unit coupling direction of the production facility toward another one of the plurality of production units arranged at another end of the production facility in the unit coupling direction of the production facility, each of the plurality of production units comprising: a processing section configured to execute predetermined processing; a control section configured to electrically control an operation of the processing section; a rail member constructing the guide rail; a slide member constructing the transfer means, the slide member comprising a workpiece holding portion; and a connector configured to electrically connect the control section of the each of the plurality of production units and the control section of one of the plurality of production units adjacent to the each of the plurality of production units. Note that, the "predetermined processing" herein encompasses various kinds of processing necessary to obtain a product (completed product), such as assembling of components to a workpiece, inspection of a component assembling state, assembling of members, inspection of appearance of the workpiece, and inspection of performance of the workpiece.

As described above, the production facility according to the one embodiment of the present invention comprises the plurality of production units coupled (mechanically connected) to each other in a separable manner, and each of the plurality of production units comprises the processing section, the control section, the rail member, and the slide member. Therefore, even when the object to be produced is changed and any process step needs to be changed along with the change of the object to be produced, the production facility is compatible with the change of the process step flexibly and promptly. In particular, each of the plurality of production units comprises the connector configured to electrically connect the control section thereof and the control section of the adjacent production unit, thereby being capable of facilitating work of constructing an electric system (electric circuit) of the production facility to promptly change the process step. That is, when the above-mentioned configuration is employed, the control sections can electrically be connected to each other through the connectors provided to the respective production units. Therefore, when any one of the production units (control sections) has a configuration connectable to a main power source, electric power and line signals can be supplied to all the production units (control sections) so that all the processing sections can be actuated. Further, in this case, as long as the guide rail and the transfer means may be formed, the production units other than the production unit connected to the main power source may be arranged at arbitrary positions without considering how the electric power line is arranged unlike the production facility of Patent Literature 1. Therefore, the degree of freedom of how the production units are arranged is enhanced, thereby being capable of facilitating design of the line.

In addition, the production facility according to the one embodiment of the present invention is configured to sequentially transfer the workpiece from one of the plurality of production units arranged at one end of the production facility in the unit coupling direction of the production facility toward another one of the plurality of production units arranged at another end of the production facility in the unit coupling direction of the production facility. Besides, the workpiece holding portions each being configured to hold the workpiece are provided to the slide members of the respective production units. Therefore, the predetermined processings can be executed for as many workpieces as the production units at the same time (in parallel to each other), thereby being capable of enhancing the production efficiency, the inspection efficiency, and the like.

In the production facility having the above-mentioned configuration, two of the plurality of production units adjacent to each other may be coupled to each other in a separable manner through intermediation of first coupling means for coupling the slide members of the two of the plurality of production units to each other, and second coupling means for coupling bases of the two of the plurality of production units to each other. Note that, the "base" herein refers to a structure holding the processing section, the control section, the rail member, and the like in a fixed manner.

When the two adjacent production units are coupled to each other through intermediation of the first coupling means for coupling the slide members of the two production units to each other as described above, the coupling of the production units and the above-mentioned formation of the transfer means can be realized at the same time. Further, the two adjacent production units are also coupled to each other through intermediation of the second coupling means for coupling the bases of the two production units to each other, thereby being capable of stably coupling the production units to each other. At this time, the second coupling means may have structure capable of restricting relative movement of the two of the plurality of production units adjacent to each other in the unit coupling direction of the production facility and two directions orthogonal to the unit coupling direction of the production facility. Thus, the relative movement of the two adjacent production units can be restricted in the three directions, that is, the X, Y, and Z directions, thereby being capable of effectively preventing the relative movement of the production units and therefore preventing degradation in operation accuracy of the transfer means and processing accuracy of each processing section or the like due to the relative movement.

In the production facility having the above-mentioned configuration, when L1 represents a base dimension of one of the plurality of production units in the unit coupling direction of the production facility, a base dimension of each of the plurality of production units other than the one of the plurality of production units in the unit coupling direction of the production facility may be set to L1×n, where n is a positive integer equal to or larger than 1. With this configuration, even when there is a need for a non-standard production unit, the number of production units can be increased or decreased easily and promptly. When n=1 is set in this configuration and the base dimensions of all the production units are therefore set equal to each other, the number of production units can be increased or decreased more easily and promptly. In this case, when a dimension of the rail member of the each of the plurality of production units in the unit coupling direction of the production facility is set to L2 and a dimension of the slide member of the each of the plurality of production units in the unit coupling direction of the production facility is set to L3, common constituent members can be used for the respective production units to reduce the manufacturing cost of the production units themselves. Further, when the common dimensions in the unit coupling direction of the production facility are set for the respective rail members and the respective slide members as described above, the moving amount of the transfer means can be controlled accurately.

The transfer means may be slid along the guide rail through drive of a motor mounted and fixed to, for example, one or more slide members. In the production facility of the one embodiment of the present invention, however, the plurality of production units are coupled to each other in a separable manner, and hence, if the production unit comprising the slide member having the motor mounted and fixed thereto is removed from the production facility, the transfer means cannot be slid. Thus, it is preferred that the production facility further comprise drive means for moving the transfer means along the guide rail, the drive means being provided separately from the transfer means.

The above-mentioned drive means may comprise, for example: an electric motor; a power conversion mechanism configured to convert rotational power of the electric motor to power in the unit coupling direction of the production facility; and power transmission means for transmitting the power in the unit coupling direction of the production facility to the transfer means. When the electric motor is used as a drive source configured to apply a drive force to the transfer means as described above, it is possible to accurately control the moving speed and the moving amount of the transfer means and how the transfer means is operated, thereby facilitating setting for optimum production conditions in accordance with the type of workpiece (processing to be carried out for the workpiece) and the like. Note that, the ON/OFF switching of the electric motor, the drive speed, the drive time, and the like may be controlled by the control section of the above-mentioned one production unit comprising the drive means.

The production facility according to the one embodiment of the present invention has the features as described above, and is therefore suited to production, inspection, or the like of products such as various rolling bearings and constant velocity universal joints, for which the process step needs to be changed frequently due to large numbers of types and product numbers.

Advantageous Effects of Invention

As described above, according to the one embodiment of the present invention, it is possible to provide the production facility easily compatible with a change of a production step, and also capable of enhancing the productivity.

DESCRIPTION OF EMBODIMENTS

Now, embodiments of the present invention are described with reference to the drawings.

Figure 1:
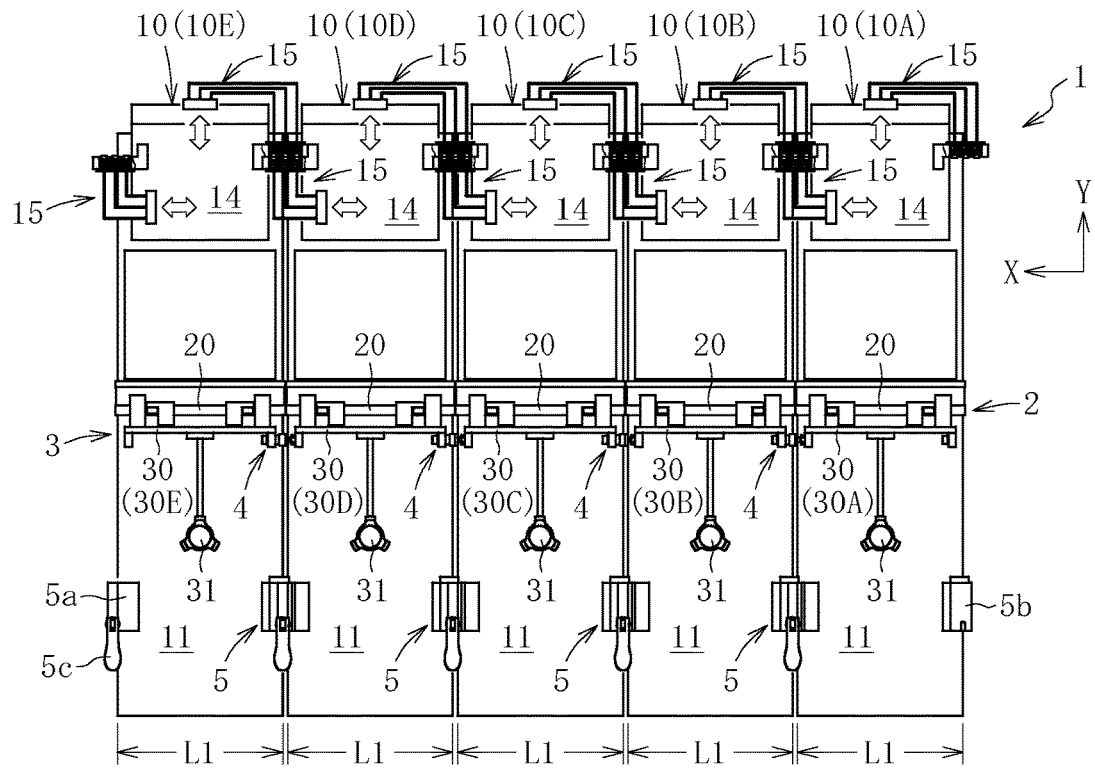
FIG. 1 is a schematic plan view of a production facility according to a first embodiment of the present invention.
Figure 2:
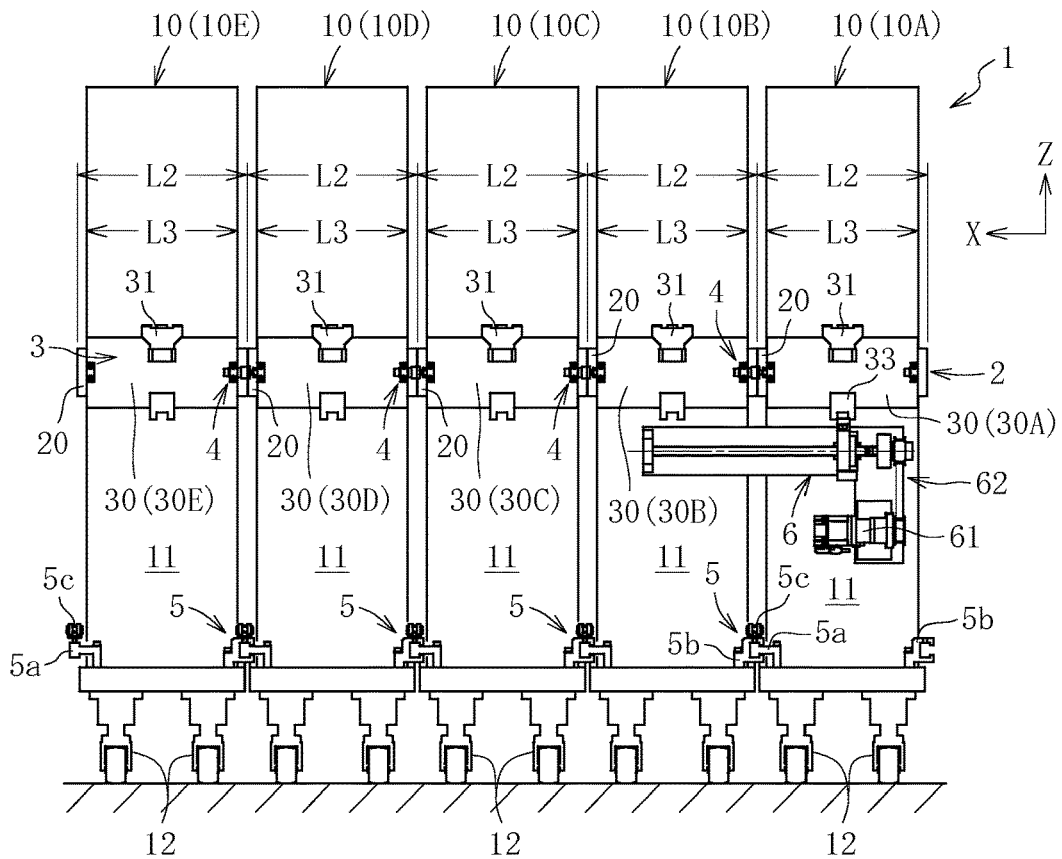
FIG. 2 is a schematic front view of the production facility according to the first embodiment of the present invention.
Figure 3:
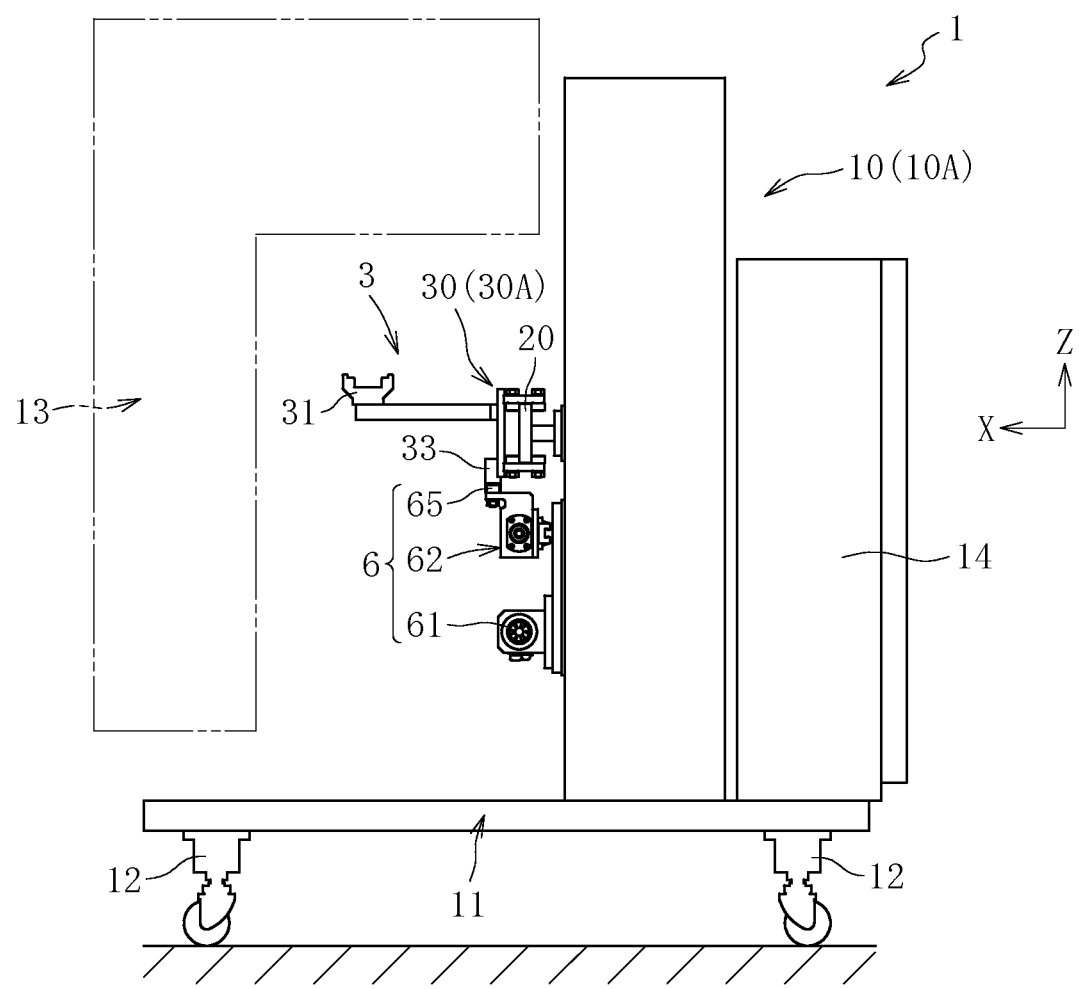
FIG. 3 is a schematic side view of the production facility according to the first embodiment of the present invention.

FIG. 1 to FIG. 3 are a schematic plan view, a schematic front view, and a schematic side view of a production facility 1 according to a first embodiment of the present invention, respectively. The production facility 1 of this embodiment is used for automatically executing an inspection step for determining and inspecting whether a bearing for a wheel (structural details are described later) is an accepted product or a rejected product. The production facility 1 comprises a plurality of (in this case, five) production units 10 coupled to each other in a separable manner (when distinguishing the five production units 10, the production units 10 are hereinafter referred to as "first production unit 10A to fifth production unit 10E"), a guide rail 2 extending in a unit coupling direction, and transfer means 3 for sequentially transferring, by moving along the guide rail 2, a workpiece (bearing for a wheel) from the first production unit 10A arranged at one end of the production facility 1 in the unit coupling direction toward the fifth production unit 10E arranged at the other end of the production facility 1 in the unit coupling direction. Note that, the production facility 1 of this embodiment has the five production units 10A to 10E linearly coupled to each other so that a line segment extending through the guide rails 2 (or guide surfaces of the guide rails 2) becomes a straight line.

Figure 4:
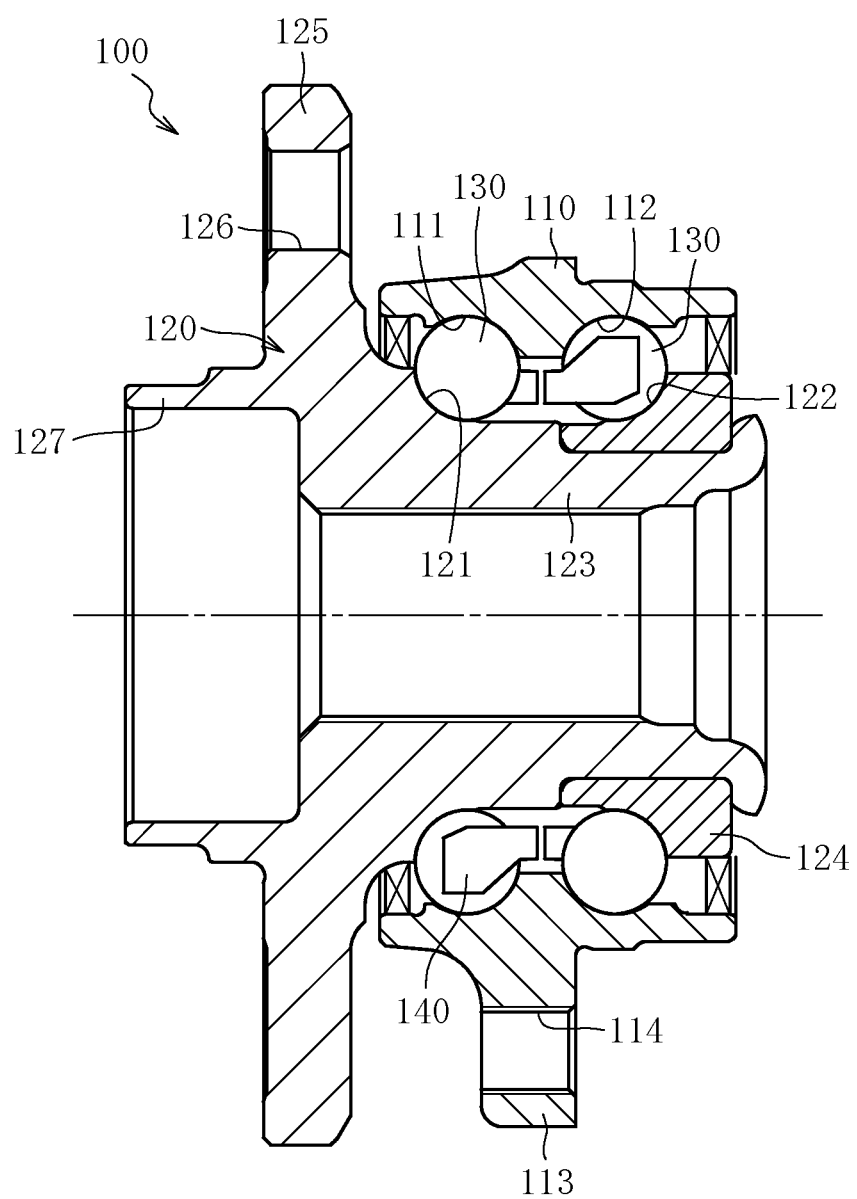
FIG. 4 is a schematic sectional view of an example of a workpiece to be loaded into the production facility illustrated in FIG. 1.

Now, an example of the bearing for a wheel to be loaded into the production facility 1 of this embodiment is described with reference to FIG. 4. A bearing 100 for a wheel illustrated in FIG. 4 constructs a bearing device for a wheel, which is configured to support a wheel of a vehicle such as an automobile so as to be freely rotatable relative to a vehicle body. The bearing 100 for a wheel comprises an outer member 110 having double-row outer raceway surfaces 111 and 112 formed on an inner periphery thereof, an inner member 120 having double-row inner raceway surfaces 121 and 122 formed on an outer periphery thereof, balls 130 interposed between the raceway surfaces provided in pairs, and a cage 140 configured to retain the balls 130 at predetermined intervals in a circumferential direction of the bearing 100 for a wheel. A lubricant such as grease is filled into an internal space of the bearing 100 for a wheel. The outer member 110 integrally comprises a flange 113 extending radially outward, and the flange 113 has a bolt hole 114 through which a bolt member configured to mount the outer member 110 to the vehicle body is inserted. The inner member 120 is formed by fitting a second inner member 124 onto an outer periphery of a first inner member 123, and the inner raceway surfaces 121 and 122 are formed on the radially outer surfaces of the first and second inner members 123 and 124, respectively. The first inner member 123 integrally comprises a flange 125 extending radially outward, and a cylindrical pilot portion 127 formed so as to project in an axial direction of the first inner member 123, and the flange 125 has a bolt hole 126 through which a bolt member configured to mount the inner member 120 to the wheel is inserted.

As illustrated in FIG. 1 to FIG. 3, each of the five production units 10A to 10E comprises a processing section 13 configured to execute predetermined processing, a control section 14 configured to electrically control an operation of the processing section 13, a rail member 20 extending in the unit coupling direction, and a slide member 30 slidable along the rail member 20. The slide member 30 comprises a workpiece holding portion 31 configured to hold the workpiece (bearing 100 for a wheel). In each production unit 10, the processing section 13, the control section 14, and the rail member 20 are held by a base (structure) 11 in a fixed manner, and casters 12 configured to support the production unit 10 in a freely movable manner are mounted to the lower end of the base 11.

When distinguishing the slide members 30 provided to the five production units 10A to 10E in the following description, the slide member provided to the first production unit 10A is represented by reference symbol 30A. Similarly, the slide members provided to the second production unit 10B to the fifth production unit 10E are represented by reference symbols 30B to 30E, respectively.

The base dimension of each of the five production units 10A to 10E (dimension of the base 11 in the unit coupling direction) is set to L1. Further, the dimension of each of the rail members 20 in the unit coupling direction, which are provided to the five production units 10A to 10E, is set to L2, and the dimension of each of the slide members 30 (30A to 30E) in the unit coupling direction, which are provided to the five production units 10A to 10E, is set to L3. That is, the five production units 10A to 10E are respectively formed through use of the bases 11, the rail members 20, and the slide members 30 each having the same dimension in the unit coupling direction, and the installation heights of the respective rail members 20 from the bases 11 are common to all the production units 10. To summarize the above description, the five production units 10A to 10E are standardized to have basically the same structure and dimensions except for the processing sections 13 and the control sections 14 (electric circuits and programs) provided to the respective production units 10A to 10E.

The two adjacent production units 10 and 10 are coupled to each other in a separable manner through intermediation of first coupling means 4 for coupling the respective slide members 30 to each other in a separable manner, and second coupling means 5 for coupling the respective bases 11 to each other in a separable manner. That is, in this embodiment, the first production unit 10A and the second production unit 10B, the second production unit 10B and the third production unit 10C, the third production unit 10C and the fourth production unit 10D, and the fourth production unit 10D and the fifth production unit 10E are each coupled to each other in a separable manner through intermediation of the first and second coupling means 4 and 5 provided therebetween. Further, with the configuration in which the two adjacent production units 10 and 10 are coupled to each other through intermediation of the first and second coupling means 4 and 5, the guide rail 2 is formed through the cooperation of the rail members 20 provided to the five production units 10A to 10E, and the transfer means 3 is formed of the slide members 30 provided to the five production units 10A to 10E, and the first coupling means 4 for coupling the respective slide members 30 to each other.

Next, description is given of structural details of the rail member 20 and the slide member 30 provided to each of the five production units 10A to 10E, and structural details of the first coupling means 4 for coupling the respective slide members 30 to each other and the second coupling means 5 for coupling the respective bases 11 to each other.

Figure 5A:
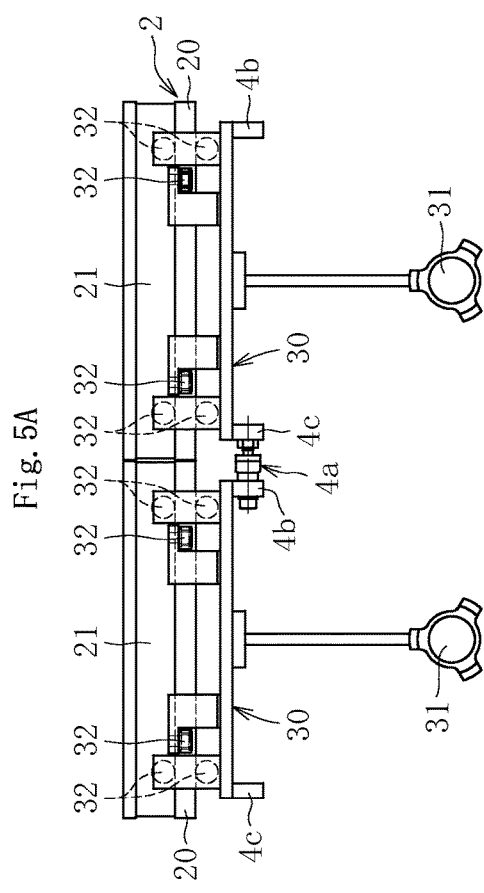
FIG. 5A is an enlarged view of a main part of FIG. 1.
Figure 5C:
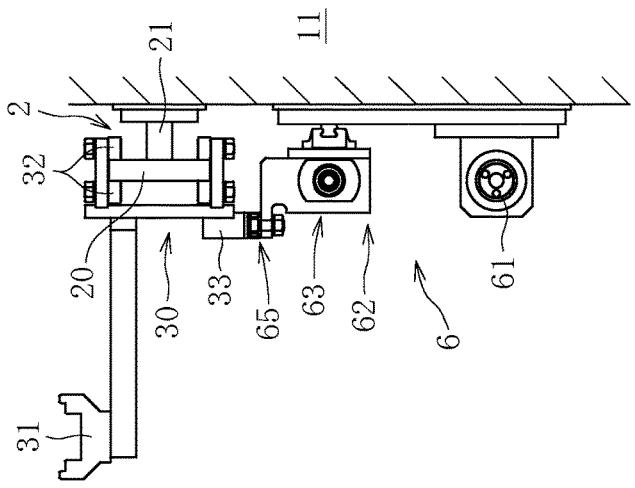
FIG. 5C is an enlarged view of a main part of FIG. 3.
Figure 5B:
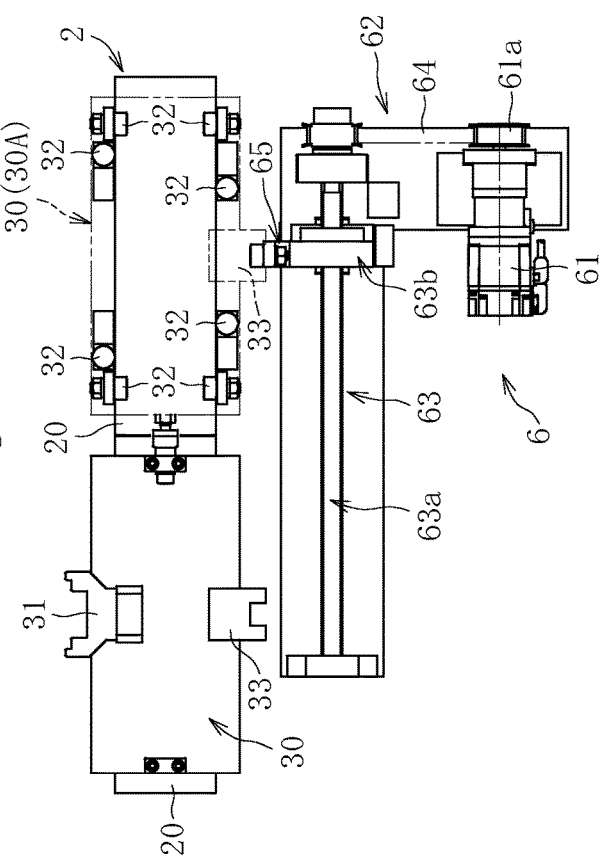
FIG. 5B is an enlarged view of a main part of FIG. 2.

As illustrated in FIG. 5A to FIG. 5C, the rail member 20 is formed of a plate-like member having a predetermined thickness. The rail member 20 is formed into a rectangular shape with its longitudinal direction corresponding to the unit coupling direction in front view (see FIG. 5B). The rail member 20 is fixed to the base 11 through intermediation of a bracket 21.

As illustrated in FIG. 5A to FIG. 5C, a plurality of rollers 32, which are rollable along the surfaces of the rail member 20, are mounted and fixed to the slide member 30. In this embodiment, four rollers 32 are arranged on the front surface side of the rail member 20 and another four rollers 32 are arranged on the back surface side of the rail member 20 so that the rail member 20 is sandwiched between the rollers 32 in its thickness direction, whereas two rollers 32 are arranged on the upper side of the rail portion 20 and another two rollers 32 are arranged on the lower side of the rail portion 20 so that the rail member 20 is sandwiched between both the upper and lower sides (a total of twelve rollers 32 are mounted and fixed to the slide member 30). Through the arrangement of the rollers 32 in this manner, the posture of the slide member 30 relative to the rail member 20 can be maintained appropriately, and the slide member 30 (transfer means 3) can be slid smoothly along the rail member 20 (guide rail 2).

As illustrated in FIG. 1, FIG. 2, FIG. 5A, and FIG. 5B, the first coupling means 4 comprises a floating joint 4a, a holding member 4b arranged at an end portion of the slide member 30 of one of the two adjacent production units 10 and 10, which is configured to hold one end of the floating joint 4a in a fixed manner, and a holding member 4c arranged at an end portion of the slide member 30 of the other of the two adjacent production units 10 and 10, which is configured to hold the other end of the floating joint 4a in a fixed manner. As described above, when the slide members 30 and 30 of the two adjacent production units 10 and 10 are coupled to each other with the first coupling means 4 comprising the floating joint 4a, misalignment of one of the two adjacent slide members 30 and 30 from the other can be prevented to the extent possible. Thus, the transfer means 3 can be slid smoothly along the guide rail 2.

As illustrated in FIG. 1 and FIG. 2, the second coupling means 5 has structure capable of restricting relative movement of the two adjacent production units 10 and 10 in the unit coupling direction (X direction) and two directions orthogonal to the unit coupling direction [depth direction of the production unit 10 (Y direction) and height direction of the production unit 10 (Z direction)]. Thus, the relative movement of the two adjacent production units 10 and 10 can be restricted in the three directions, that is, the X, Y, and Z directions, thereby being capable of effectively preventing the relative movement of the production units 10 and therefore preventing degradation in inspection accuracy or the like due to the relative movement.

Figure 6A:
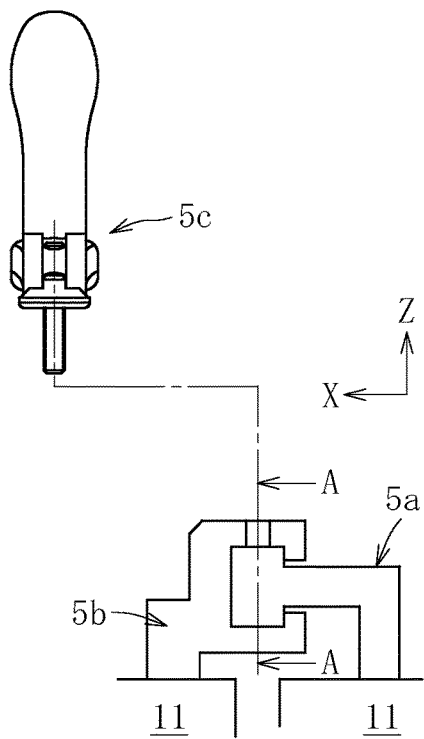
FIG. 6A is a schematic view of how coupling is carried out by second coupling means.
Figure 6B:
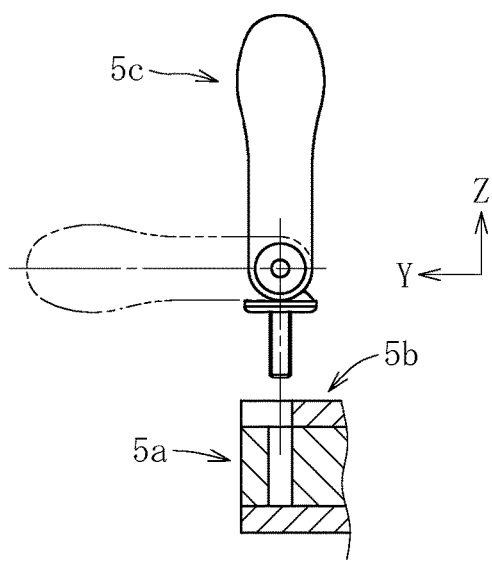
FIG. 6B is an enlarged sectional view taken along the line A-A of FIG. 6A when viewed in a direction indicated by the arrows.

In this embodiment, as illustrated in FIG. 6A and FIG. 6B as well, the second coupling means 5 comprises a male coupling member 5a arranged at an end portion of the base 11 of one of the two adjacent production units 10 and 10, a female coupling member 5b arranged at an end portion of the base 11 of the other of the two adjacent production units 10 and 10, to which an end portion of the male coupling member 5a is fitted, and a fastening member 5c configured to fasten both the coupling members 5a and 5b together, to thereby achieve the above-mentioned object. More specifically, when the end portion of the male coupling member 5a arranged on the base 11 of one of the two adjacent production units 10 and 10 is fitted to the female coupling member 5b arranged on the base 11 of the other of the two adjacent production units 10 and 10, the relative movement of the two adjacent production units 10 and 10 in the X direction and the Z direction is restricted (see FIG. 6A). When the fastening member 5c is subsequently fastened to both the coupling members 5a and 5b, the relative movement of the two adjacent production units 10 and 10 in the Y direction is restricted (see FIG. 6B).

With the above-mentioned configurations of the first and second coupling means 4 and 5, the coupling (mechanical connection) between the production units 10 is completed only through execution of the following steps (1) and (2) of work.

(1) One end of the floating joint 4a is held by the holding member 4b arranged at the end portion of the slide member 30 of one of the two adjacent production units 10 and 10, whereas the other end of the floating joint 4a is held by the holding member 4c arranged at the end portion of the slide member 30 of the other of the two adjacent production units 10 and 10.

(2) The end portion of the male coupling member 5a arranged at the end portion of the base 11 of one of the two adjacent production units 10 and 10 is fitted to the female coupling member 5b arranged at the end portion of the base 11 of the other of the two adjacent production units 10 and 10, and then the fastening member 5c is fastened to both the coupling members 5a and 5b.

Note that, to decouple the production units 10 (separate the production units 10) from each other, a procedure reverse to that of the above-mentioned steps (1) and (2) only needs to be executed.

Figure 7A:
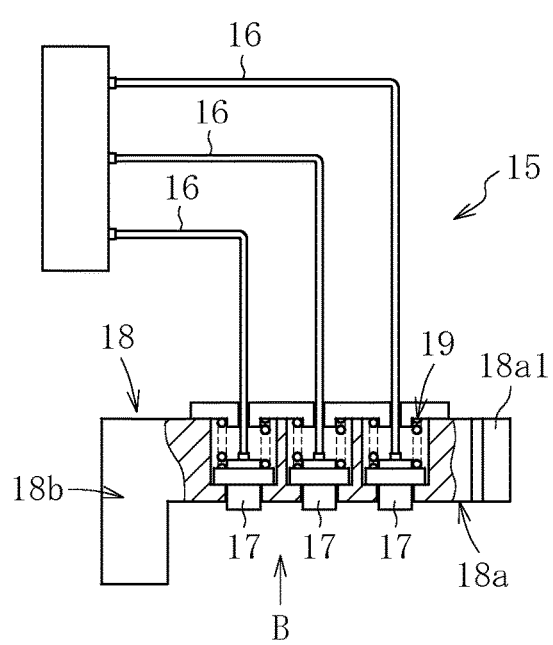
FIG. 7A is an enlarged view of a connector.
Figure 7B:
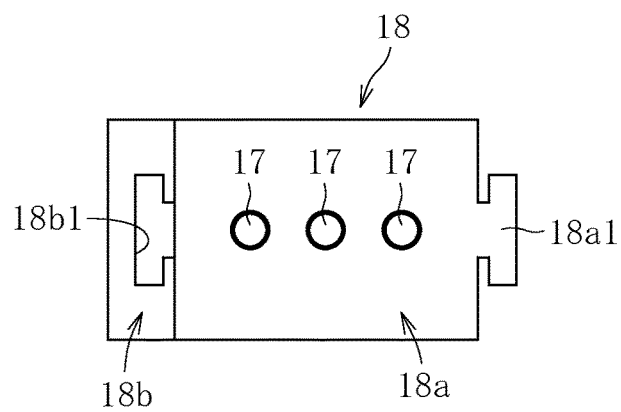
FIG. 7B is a view of the connector of FIG. 7A when viewed in a direction indicated by the arrow B.

As illustrated in FIG. 1, to electrically connect the control section 14 of each of the five production units 10A to 10E and the control sections 14 of the production units 10 arranged adjacent thereto, each of the five production units 10A to 10E comprises two connectors 15. As illustrated in FIG. 7A and FIG. 7B as well, each connector 15 comprises a plurality of (in the illustrated example, three) electric wires 16 each having one end connected to the electric circuit provided inside the control section 14, terminals 17 each being electrically connected to the other end of the electric wire 16, and a casing 18 that holds the terminals 17. The casing 18 substantially has an L-shape integrally comprising a long-side portion 18a having a fitting piece 18a1 formed at one end of the long-side portion 18a (one end of the long-side portion 18a in its longitudinal direction), and a short-side portion 18b formed at the other end of the long-side portion 18a in its longitudinal direction. The short-side portion 18b has a fitting groove 18b1 formed therein so that the fitting piece 18a1 formed on the casing 18 of another connector 15 may be fitted to the fitting groove 18b1. The casing 18 further holds a support mechanism 19 that supports the terminals 17 in a biasing manner. Under a state in which the connector 15 (casing 18) is not connected to another connector 15 (casing 18), a part of each terminal 17 projects from one end surface of the long-side portion 18a of the casing 18.

Figure 8:
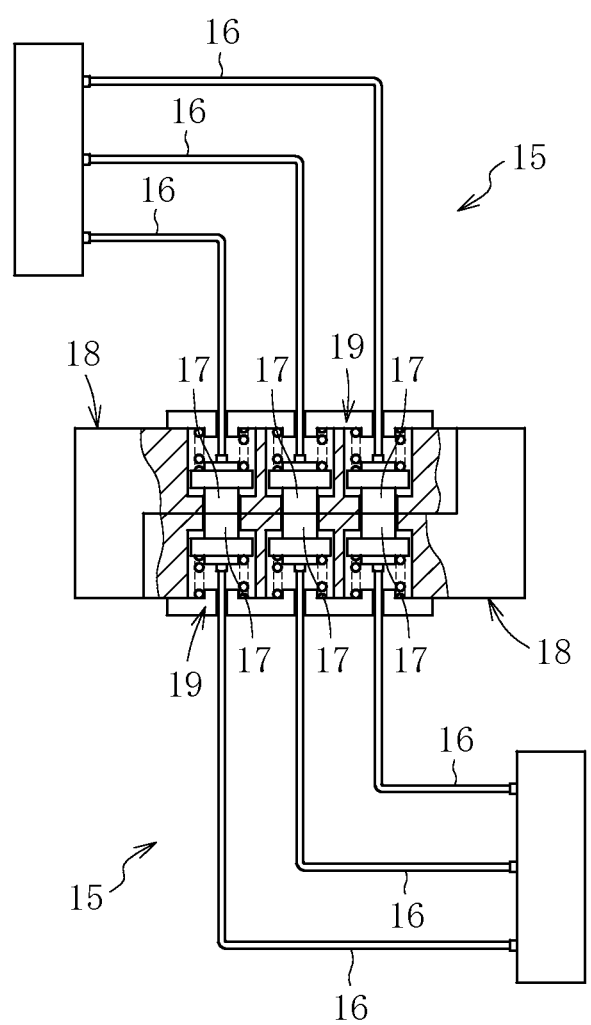
FIG. 8 is a view of a connecting state of the connectors.

With the above-mentioned configuration, when the fitting piece 18a1 of the connector 15 provided to the control section 14 of one of the two adjacent production units 10 and 10 is fitted to the fitting groove 18b1 of the connector 15 provided to the control section 14 of the other of the two adjacent production units 10 and 10, as illustrated in FIG. 8, the terminals 17 of one connector 15 and the terminals 17 of the other connector 15 can securely be brought into contact with each other, that is, the control sections 14 and 14 of the two adjacent production units 10 and 10 can electrically be connected to each other. Thus, electric power and line signals can be distributed between the control sections 14 and 14 of the two adjacent production units 10 and 10. To release the electrically-connecting state of the control sections 14 and 14 (separate the production units 10 from each other), conversely, the fitting state of the fitting piece 18a1 of one connector 15 and the fitting groove 18b1 of the other connector 15 only needs to be released.

The transfer means 3 is slid along the guide rail 2 when receiving power from drive means 6 provided separately from the transfer means 3. In this embodiment, as illustrated in FIG. 2, FIG. 3, FIG. 5B, and FIG. 5C, the drive means 6 is provided below the transfer means 3 across the first and second production units 10A and 10B (or the bases 11 of the first and second production units 10A and 10B). The drive means 6 mainly comprises an electric motor 61, a power conversion mechanism 62 configured to convert rotational power of the electric motor 61 to power in the unit coupling direction (linear power), and a cam follower 65 serving as a power transmission member configured to transmit the linear power to the transfer means 3. The power conversion mechanism 62 comprises a ball screw 63 having a screw shaft 63a extending in parallel to the unit coupling direction and a nut 63b configured to reciprocate along the screw shaft 63a, and an endless thread member (for example, an endless belt) 64 looped around pulleys mounted to an output shaft 61a of the electric motor 61 and the screw shaft 63a of the ball screw 63. The cam follower 65 is mounted and fixed to an outer periphery of the nut 63b of the ball screw 63 so that the distal end portion of the cam follower 65 engages with a receiving member 33 mounted and fixed to the slide member 30 (in this embodiment, the slide member 30A) in the unit coupling direction. Drive control for the drive means 6 (electric motor 61), that is, movement control for the transfer means 3 may be carried out by, for example, the control section 14 mounted to the first production unit 10A.

Note that, the motor may be mounted and fixed to, for example, one or more slide members 30, and the entire transfer means 3 may be slid along the guide rail 2 through the drive of the motor. However, the production facility 1 of the present invention is formed by coupling the plurality of production units 10 to each other in a separable manner, and hence, if the production unit 10 comprising the slide member 30 having the motor mounted and fixed thereto is removed, the transfer means 3 cannot be slid. Therefore, it is preferred that the transfer means 3 and the drive means 6 be provided separately from each other as described above. Further, with this configuration, maintenance of the transfer means 3 and the drive means 6 can be carried out individually, thereby attaining an advantage in that the maintainability is enhanced.

Next, description is given of the processing section 13 (see FIG. 3) held by (mounted to) the base 11 of each of the five production units 10A to 10E. To prevent complexity of the figures, structural details of the processing section 13 are not illustrated in FIG. 3 and the like.

The first production unit 10A receives the bearing 100 for a wheel, which is assembled in another production facility (production step) (not shown). Therefore, a reception apparatus configured to receive the bearing 100 for a wheel to be inspected is mounted to the base 11 of the first production unit 10A as the processing section 13. Note that, a reloading conveyor configured to reload, into the production facility 1, the bearing 100 for a wheel, which is determined as a rejected product through the inspection step executed in the production facility 1, is mounted to the first production unit 10A of this embodiment as the processing section 13. Those operations of the processing section 13 are electrically controlled by the control section 14 mounted to the base 11 of the first production unit 10A.

The second production unit 10B executes processing of leveling (smoothing) the grease filled into the internal space of the bearing 100 for a wheel. Therefore, a rotation apparatus configured to rotate the bearing 100 for a wheel is mounted to the base 11 of the second production unit 10B as the processing section 13. This operation of the processing section 13 is electrically controlled by the control section 14 mounted to the base 11 of the second production unit 10B.

The third production unit 10C executes processing of measuring and detecting, with a measurement device such as a sensor, vibrations to be generated along with relative rotation of the outer member 110 and the inner member 120 about their axes, and determining and inspecting, based on detection values obtained through the measurement and detection, whether or not the bearing 100 for a wheel is an accepted product, more specifically, whether or not each of the raceway surfaces 111 and 112 of the outer member 110 and the raceway surfaces 121 and 122 of the inner member 120 is finished to have a surface profile, surface roughness, and the like satisfying predetermined accuracy. Therefore, a first inspection apparatus configured to automatically execute the above-mentioned determination and inspection is mounted to the base 11 of the third production unit 10C as the processing section 13. This operation of the processing section 13 is electrically controlled by the control section 14 mounted to the base 11 of the third production unit 10C.

The fourth production unit 10D executes processing of measuring and detecting the amount of run-out to be caused at the flange 125 and the pilot portion 127 when the inner member 120 is rotated about its axis under a state in which the outer member 110 is fixed, and determining and inspecting, based on detection values obtained through the measurement and detection, whether or not the bearing 100 for a wheel is an accepted product, more specifically, whether or not the perpendicularity of the end surface of the flange 125 and the parallelism and the cylindricity of the radially outer surface of the pilot portion 127 with respect to the axis of the bearing 100 for a wheel are secured. Therefore, a second inspection apparatus configured to automatically execute the above-mentioned determination and inspection is mounted to the base 11 of the fourth production unit 10D as the processing section 13. This operation of the processing section 13 is electrically controlled by the control section 14 mounted to the base 11 of the fourth production unit 10D.

The fifth production unit 10E executes processing of sorting the bearing 100 for a wheel as an accepted product or a rejected product based on results of the inspection executed by the above-mentioned third and fourth production units 10C and 10D. Therefore, a sorting apparatus configured to automatically execute the above-mentioned sorting processing is mounted to the base 11 of the fifth production unit 10E. Note that, the accepted product is conveyed to a subsequent step (not shown), whereas the rejected product is discharged out of the production facility 1 by a rejected-product discharging conveyor. This operation of the processing section 13 is electrically controlled by the control section 14 mounted to the base 11 of the fifth production unit 10E.

Although illustration is omitted, the second to fourth production units 10B to 10D each comprise intra-unit conveyance means. Description is given by taking the intra-unit conveyance means of the second production unit 10B as an example. This intra-unit conveyance means is configured to automatically execute an operation of receiving the bearing 100 for a wheel, which is transferred from the first production unit 10A onto the second production unit 10B by the transfer means 3, and delivering the bearing 100 for a wheel to the processing section 13 (rotation apparatus), and an operation of delivering the bearing 100 for a wheel, which is subjected to the grease leveling processing by the processing section 13, to the transfer means 3 again. Although illustration is omitted similarly, at least one of the five production units 10 (first to fifth production units 10A to 10E) has a configuration capable of connecting the control section 14 of the production unit 10 to a main power source (not shown).

The production facility 1 of this embodiment has the above-mentioned configuration to automatically execute the inspection step for the bearings 100 for a wheel (100A, 100B, 100C, . . . ) in the following manner.

Figure 9A:
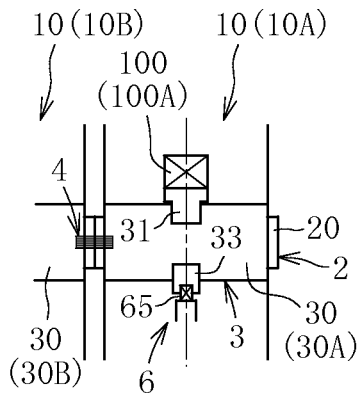
FIG. 9A is a schematic view for illustrating how transfer means is operated.
Figure 9B:
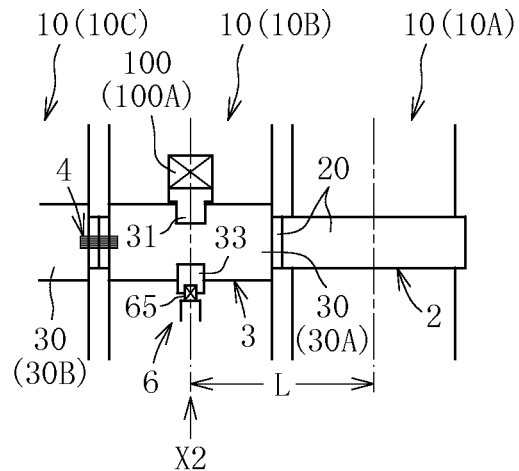
FIG. 9B is a schematic view for illustrating how the transfer means is operated.
Figure 9C:
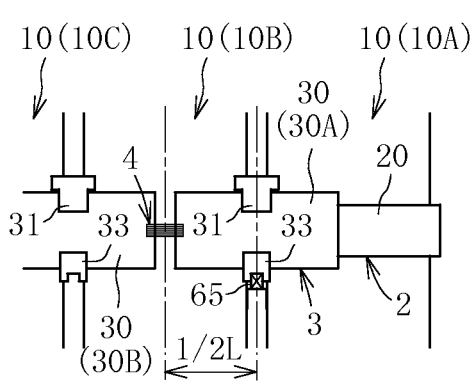
FIG. 9C is a schematic view for illustrating how the transfer means is operated.

First, as illustrated in FIG. 9A, the bearing 100 for a wheel (bearing 100A for a wheel, which is first loaded into the production facility 1) is loaded into the first production unit 10A. When the bearing 100A for a wheel is held by the workpiece holding portion 31 of the slide member 30A constructing the transfer means 3, the electric motor 61 constructing the drive means 6 is rotated in a forward direction, and the entire transfer means 3 is advanced along the guide rail 2 along with the forward rotation. As illustrated in FIG. 9B, the transfer means 3 is advanced until the bearing 100A for a wheel, which is held by the workpiece holding portion 31 of the slide member 30A, reaches a position in the second production unit 10B where the bearing 100A for a wheel is receivable by the intra-unit conveyance means of the second production unit 10B (position indicated by the arrow X2 in FIG. 9B). When the advance of the transfer means 3 is completed, the bearing 100A for a wheel, which is held by the workpiece holding portion 31 of the slide member 30A, is received by the intra-unit conveyance means of the second production unit 10B. In this manner, the transfer of the bearing 100A for a wheel to the second production unit 10B is completed. When the transfer of the bearing 100A for a wheel to the second production unit 10B is completed, the electric motor 61 is rotated in a reverse direction. Along with the reverse rotation, as illustrated in FIG. 9C, the entire transfer means 3 is retreated by a predetermined amount (when L represents the amount of the above-mentioned advance of the transfer means 3, ½ L in this case) so that the slide member 30A is positioned between the first production unit 10A and the second production unit 10B. This operation is carried out for the purpose of preventing interference between the intra-unit conveyance means of the second production unit 10B and the workpiece holding portion 31 of the transfer means 3 along with actuation of the intra-unit conveyance means.

Figure 9D:
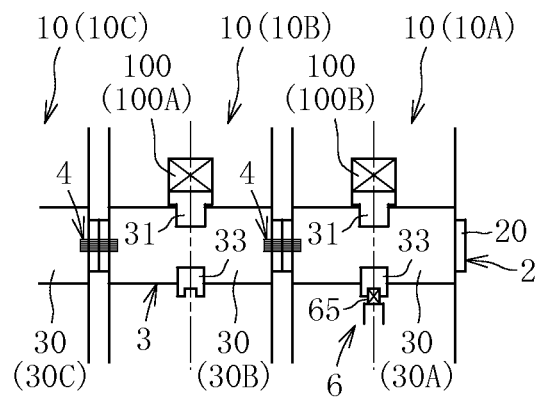
FIG. 9D is a schematic view for illustrating how the transfer means is operated.

Although illustration is omitted, after the entire transfer means 3 is retreated by the predetermined amount as described above, the bearing 100A for a wheel is conveyed by the intra-unit conveyance means of the second production unit 10B to a position where the grease leveling processing is executable by the processing section 13 of the second production unit 10B. After the bearing 100A for a wheel is subjected to the grease leveling processing by the processing section 13 of the second production unit 10B, the bearing 100A for a wheel is conveyed by the intra-unit conveyance means of the second production unit 10B to a position where the bearing 100A for a wheel is deliverable to the transfer means 3. After that, the transfer means 3 is returned to the initial position. When the transfer means 3 is returned to the initial position, as illustrated in FIG. 9D, the subsequent bearing 100 (100B) for a wheel is held by the workpiece holding portion 31 of the slide member 30A, whereas the bearing 100A for a wheel, which is subjected to the grease leveling processing, is held by the workpiece holding portion 31 of the slide member 30B of the transfer means 3.

Figure 9E:
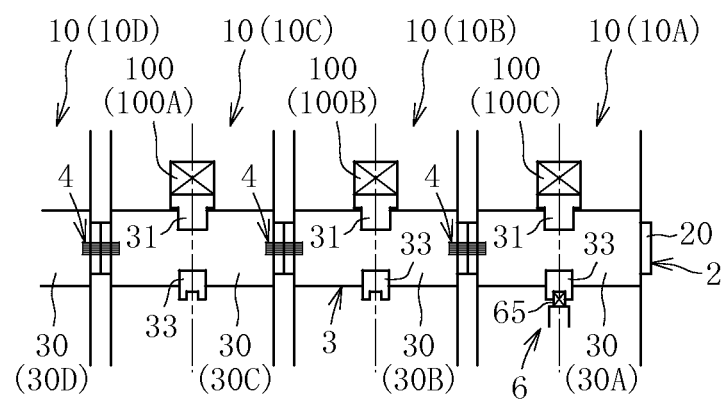
FIG. 9E is a schematic view for illustrating how the transfer means is operated.

Then, the respective parts of the production facility (transfer means 3, drive means 6, processing sections 13 of respective production units 10, and the like) are operated in a similar manner to that described above, and the transfer means 3 is returned to the initial position. Then, the subsequent bearing 100C for a wheel is held by the workpiece holding portion 31 of the slide member 30A, whereas the bearings 100B and 100A for a wheel are held by the workpiece holding portions 31 of the slide members 30B and 30C, respectively (see FIG. 9E). Afterwards, the above-mentioned operations are repeated so that the bearings 100 for a wheel, which are loaded into the production facility 1, are sequentially transferred to the first to fifth production units 10A to 10E (sequentially subjected to the predetermined processing by each of the processing sections 13 of the production units 10A to 10E) and then discharged out of the production facility 1.

As described above, the production facility 1 according to the present invention comprises the five production units 10 (10A to 10E) coupled to each other in a separable manner, and each of the five production units 10A to 10E comprises the processing section 13, the control section 14, the rail member 20, and the slide member 30. Therefore, for example, even when the bearing 100 for a wheel to be inspected is changed and any process step needs to be changed along with the change of the bearing 100 for a wheel (for example, when any inspection item is added), the production facility 1 is compatible with the change of the process step flexibly and promptly. In particular, each of the five production units 10A to 10E comprises the connectors 15 each being configured to electrically connect the control section 14 thereof and the control section 14 of the adjacent production unit 10, thereby being capable of facilitating work of constructing an electric system (power supply circuit) of the production facility 1 to promptly change the process step. The reason is as follows. That is, in this case, the control sections 14 and 14 of the adjacent production units 10 and 10 can electrically be connected to each other through the connectors 15 provided to the respective production units 10. Therefore, when at least one of the five production units 10 has the configuration connectable to the main power source as described above, electric power and line signals can be supplied to all the production units 10 (control sections 14) through the connection of the production unit 10 to the main power source. Further, in this case, the production units 10 other than the production unit 10 connected to the main power source may be arranged at arbitrary positions as long as the guide rail 2 and the transfer means 3 may be formed. Therefore, the degree of freedom of how the production units 10 are arranged is enhanced, thereby facilitating design of the line.

Further, in the production facility 1 according to the present invention, the first and second coupling means 4 and 5 for coupling the slide members 30 and 30 of the adjacent production units 10 and 10 to each other and the bases 11 and 11 of the adjacent production units 10 and 10 to each other are capable of coupling or decoupling (separating) the slide members 30 and 30 from each other and the bases 11 and 11 from each other through the above-mentioned simple operations. Therefore, the production units 10 and 10 can easily be coupled to each other, or the production units 10 and 10 thus coupled can easily be separated from each other. Also in this respect, the process step can be changed easily and promptly.

Further, as described above, the five production units 10A to 10E constructing the production facility 1 of this embodiment are standardized to have basically the same structure and dimensions except for the processing sections 13 and the control sections 14 (electric circuits and programs) provided to the respective production units 10A to 10E. With this configuration, the production unit 10 can be added or removed (the number of production units 10 can be increased or decreased) more easily and promptly so as to meet the need for the change of the process step. In addition, common constituent members can be used for the five production units 10A to 10E to reduce the manufacturing cost of the production units 10 themselves. Further, the movement control for the transfer means 3 can be simplified.

Further, the production facility 1 of the present invention is configured to sequentially transfer the bearing 100 for a wheel as the workpiece from the first production unit 10A out of the five production units 10A to 10E, which is arranged at one end of the production facility 1 in the unit coupling direction, toward the fifth production unit 10E out of the five production units 10A to 10E, which is arranged at the other end of the production facility 1 in the unit coupling direction. Besides, the workpiece holding portions 31 are provided to the slide members 30 of the respective production units 10A to 10E. Therefore, the predetermined processings can be executed for the plurality of bearings 100 for a wheel at the same time (in parallel to each other), thereby being capable of executing the inspection step for each of the bearings 100 for a wheel with high efficiency.

Figure 10:
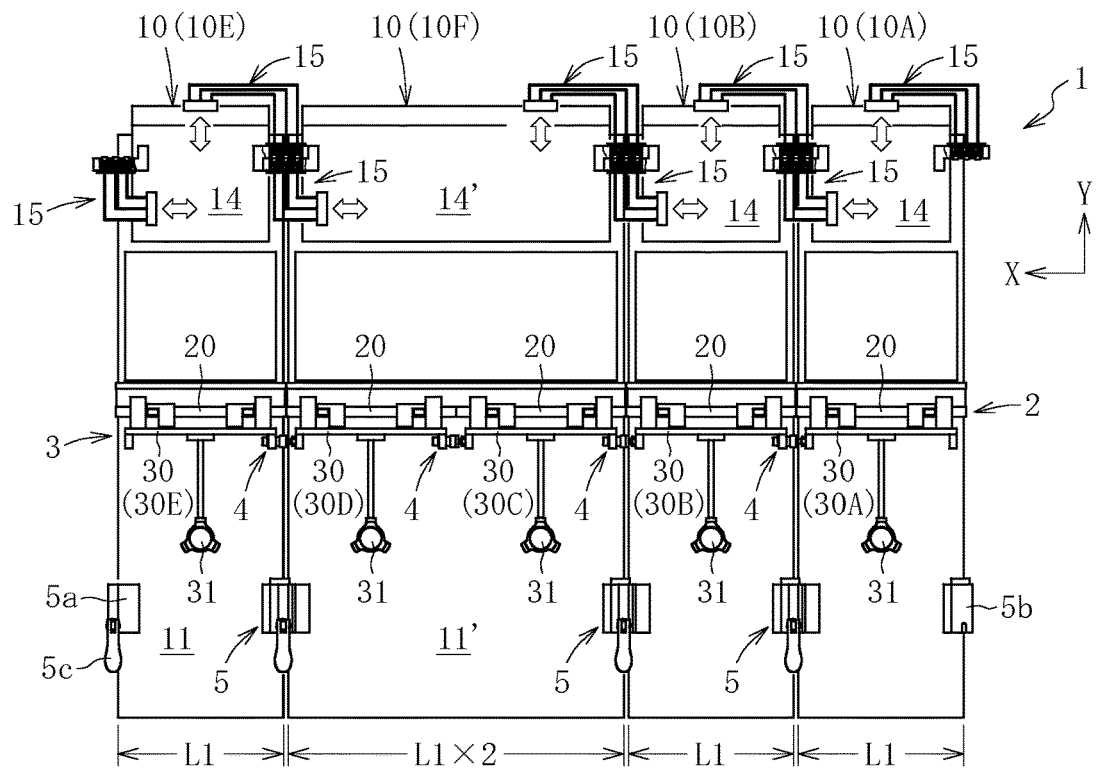
FIG. 10 is a schematic plan view of a production facility according to a second embodiment of the present invention.
Figure 11:
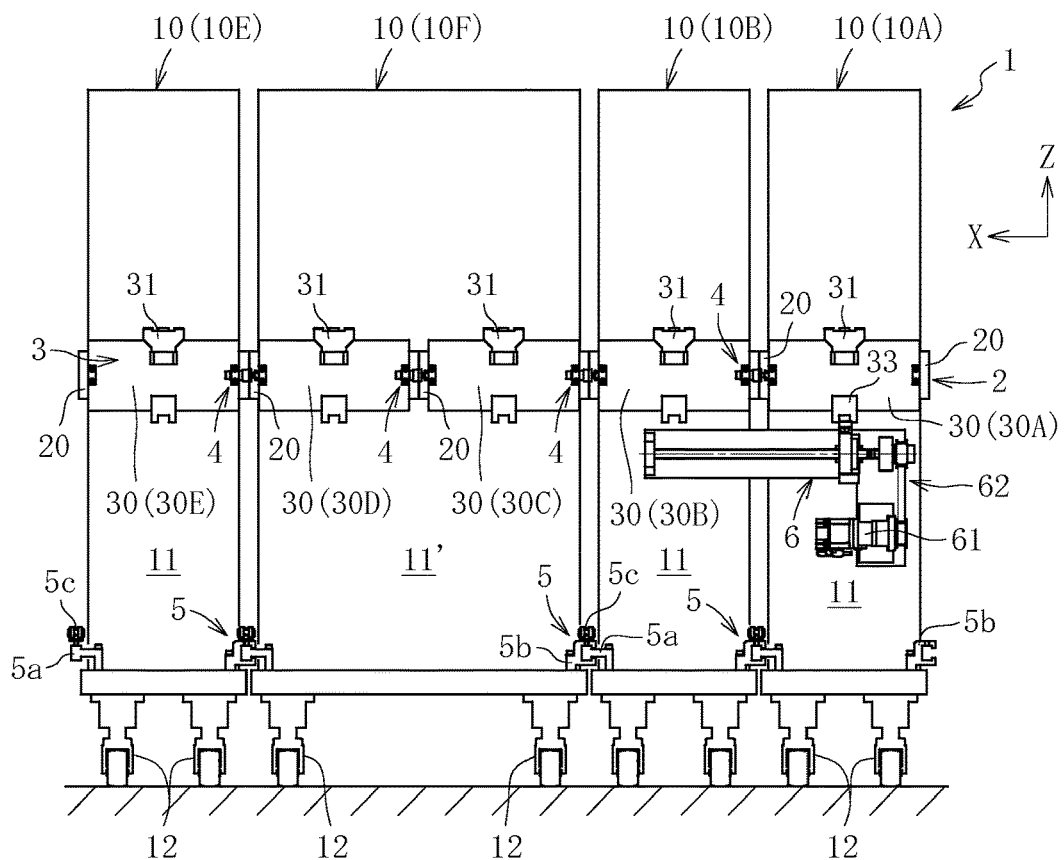
FIG. 11 is a schematic front view of the production facility according to the second embodiment of the present invention.

FIG. 10 and FIG. 11 are a schematic plan view and a schematic front view of a production facility 1 according to a second embodiment of the present invention, respectively. The production facility 1 illustrated in FIG. 10 and FIG. 11 is mainly different from the production facility 1 according to the above-mentioned first embodiment in that a production unit 10F having a different base dimension in the unit coupling direction from that of the first production unit 10A (and the second and fifth production units 10B and 10E) is arranged in place of the third and fourth production units 10C and 10D illustrated in FIG. 1 and the like.

The above-mentioned difference is described in detail. In this embodiment, when L1 represents the base dimension of the first production unit 10A in the unit coupling direction, the base dimension of the production unit 10F in the unit coupling direction is set to L1×n (provided that n is an integer equal to or larger than 1; in this case, n=2). That is, the production unit 10F comprises a base 11' having the base dimension in the unit coupling direction, which is set to L1×2, and the processing sections 13 (not shown), a control section 14', the rail members 20, and the slide members 30 are held by the base 11' in a fixed manner. Although detailed illustration is omitted, the first and second inspection apparatus, which are respectively mounted to the third and fourth production units 10C and 10D constructing the production facility 1 of the first embodiment, are mounted to the base 11' of the production unit 10F as the processing sections 13. Thus, the control section 14' configured to electrically control the operations of the processing sections 13 of the production unit 10F has a configuration capable of electrically controlling the operations of the first and second inspection apparatus. Note that, the other configuration conforms to that of the production facility 1 of the first embodiment, and detailed description thereof is therefore omitted herein. With this configuration, even when there is a need for a production unit having a non-standard base dimension in the unit coupling direction, the number of production units can be increased or decreased easily and promptly.

The production facilities 1 according to the first and second embodiments of the present invention have been described above, but any appropriate modifications may be made to those production facilities 1 without departing from the gist of the present invention.

For example, as the drive means 6 for moving the transfer means 3 along the guide rail 2, an electric cylinder comprising a cylinder rod to be extended and contracted in the unit coupling direction may be employed in place of the above-mentioned electric motor 61 and the above-mentioned power conversion mechanism 62. Further, in the case of the production facility 1 of the first embodiment of the present invention, which is illustrated in FIG. 1 and the like, the drive means 6 may be mounted and fixed across the second production unit 10B and the third production unit 10C, across the third production unit 10C and the fourth production unit 10D, or across the fourth production unit 10D and the fifth production unit 10E.

Further, the above-mentioned production facility 1 comprises the plurality of production units 10 connected in line so that the line segment extending through the guide surfaces of the guide rails 2 becomes a straight line. Any appropriate change may be made to how the production units 10 are arranged as long as the transfer means 3 is smoothly slidable along the guide rail 2. That is, the plurality of production units 10 may be coupled to each other so that, for example, the line segment extending through the guide surfaces of the guide rails 2 becomes an arc (open arc). Alternatively, the plurality of production units 10 may be coupled to each other so that the line segment extending through the guide surfaces of the guide rails 2 has an endless shape (for example, a circular or elliptical shape).

Further, the production facility 1 according to the present invention is suitably applicable to not only the case of automatically executing the inspection step for the bearing 100 for a wheel as described above but also, for example, a case of executing an assembling step for automatically assembling the bearing 100 for a wheel. Still further, the production facility 1 according to the present invention has various features as described above, and is therefore suited to mass production, inspection, or the like of products such as constant velocity universal joints as well as rolling bearings as typified by the exemplified bearing 100 for a wheel, for which the process step may be changed frequently due to large numbers of types and product numbers.

REFERENCE SIGNS LIST 1 production facility
2 guide rail
3 transfer means
4 first coupling means
4a floating joint
5 second coupling means
5a male coupling member
5b female coupling member
5c fastening member
6 drive means
10 production unit
11 base
12 caster
13 processing section
14 control section
15 connector
16 electric wire
17 terminal
20 rail member
30 slide member
61 electric motor
62 power conversion mechanism
65 cam follower (power transmission member)
100 bearing for wheel (workpiece)

The invention claimed is:

1. A production facility, comprising:
   at least three production units coupled to each other in a separable manner;
   a guide rail extending in a unit coupling direction of the production facility; and
   transfer means capable of sequentially transferring, by moving along the guide rail, a workpiece from a first of the at least three production units arranged at one end of the production facility in the unit coupling direction of the production facility toward a last of the at least three production units arranged at another end of the production facility in the unit coupling direction of the production facility,
   wherein each of the at least three production units comprises:
      a processing section configured to execute predetermined processing;
      a control section configured to electrically control an operation of the processing section;
      a rail member constructing the guide rail;
      a slide member constructing the transfer means, the slide member comprising a workpiece holding portion; and
      a connector configured to electrically connect the control section and a control section of an adjacent one of the at least three production units,
   wherein one of the at least three production units comprises drive means for moving the slide members of all of the at least three production units together as the transfer means, the drive means being separate from the transfer means, and the drive means comprising a power transmission member, and
   wherein the drive means moves the slide member of the one of the at least three production units with the power transmission member to advance and retreat between the one of the at least three production units and an adjacent one of the at least three production units to sequentially transfer the workpiece loaded into the first of the at least three production units arranged at the one end of the production facility in the unit coupling direction of the production facility toward the other end of the production facility in the unit coupling direction of the production facility.

2. The production facility according to claim 1, wherein two of the at least three production units adjacent to each other are coupled to each other in a separable manner through intermediation of first coupling means for coupling the slide members of the two of the at least three production units to each other, and second coupling means for coupling bases of the two of the at least three production units to each other.

3. The production facility according to claim 2, wherein the second coupling means has structure capable of restricting relative movement of the two of the at least three production units adjacent to each other in the unit coupling direction of the production facility and two directions orthogonal to the unit coupling direction of the production facility.

4. The production facility according to claim 1, wherein, when L1 represents a base dimension of one of the at least three production units in the unit coupling direction of the production facility, a base dimension of each of the at least three production units other than the one of the at least three production units in the unit coupling direction of the production facility is set to L1×n, where n is a positive integer equal to or larger than 1.

5. The production facility according to claim 4, wherein the positive integer satisfies n=1.

6. The production facility according to claim 5,
   wherein a dimension of the rail member of each of the at least three production units in the unit coupling direction of the production facility is set to L2, and
   wherein a dimension of the slide member of each of the at least three production units in the unit coupling direction of the production facility is set to L3.

7. The production facility according to claim 1, wherein the drive means is provided across two of the at least three production units that are adjacent to each other.

8. The production facility according to claim 1,
   wherein the drive means further comprises:
      an electric motor; and
      a ball screw as a power conversion mechanism configured to convert rotational power of the electric motor to power in the unit coupling direction of the production facility, the ball screw having a nut, and
   wherein the power transmission member is mounted to the nut of the ball screw.

* * * * *